(12) United States Patent
Van Bommel et al.

(10) Patent No.: US 10,219,346 B2
(45) Date of Patent: Feb. 26, 2019

(54) DYNAMIC COLOR SHADOWS FOR DECORATIVE WHITE LIGHTING

(71) Applicant: PHILIPS LIGHTING HOLDING B.V., Eindhoven (NL)

(72) Inventors: Ties Van Bommel, Eindhoven (NL); Rifat Ata Mustafa Hikmet, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/563,585

(22) PCT Filed: Mar. 17, 2016

(86) PCT No.: PCT/EP2016/055847
§ 371 (c)(1),
(2) Date: Sep. 30, 2017

(87) PCT Pub. No.: WO2016/156058
PCT Pub. Date: Oct. 6, 2016

(65) Prior Publication Data
US 2018/0092169 A1    Mar. 29, 2018

(30) Foreign Application Priority Data

Mar. 31, 2015  (EP) .................................. 15161843

(51) Int. Cl.
*H05B 33/08*        (2006.01)
*F21V 14/00*        (2018.01)
(Continued)

(52) U.S. Cl.
CPC ........... *H05B 33/086* (2013.01); *F21K 9/232* (2016.08); *F21V 11/08* (2013.01); *F21V 14/00* (2013.01);
(Continued)

(58) Field of Classification Search
None
See application file for complete search history.

(56) References Cited

U.S. PATENT DOCUMENTS

| 7,048,412 B2 | 5/2006 | Martin et al. |
| 2006/0002110 A1* | 1/2006 | Dowling ................... F21K 9/00 362/249.05 |

(Continued)

FOREIGN PATENT DOCUMENTS

| WO | WO2010004495 A2 | 1/2010 |
| WO | WO2013156927 A1 | 10/2013 |
| WO | WO2014147505 A1 | 9/2014 |

*Primary Examiner* — Jany Richardson
(74) *Attorney, Agent, or Firm* — Akarsh P. Belagodu

(57) ABSTRACT

The present invention relates to a lighting device (100) capable of creating dynamic color shadows. The lighting device (100) comprises multiple light sources (104, 105, 106) of different colors arranged to, together as a unit, emit white light. Furthermore, a contrast producing element (110) receives the emitted light and comprises portions (114) which may block light such that a shadow can be created on an object (122) behind the contrast producing element. A control unit (116) controls the light sources to modulate a spatial light spectral distribution if a selector is in an active state, or if the control unit is in an inactive state, white light is emitted by the lighting device. Thus, the lighting device is switchable between creating dynamic color shadows on objects while emitting white light, and only emitting white lights.

16 Claims, 4 Drawing Sheets

(51) Int. Cl.
*F21V 11/08* (2006.01)
*F21K 9/232* (2016.01)
*F21W 121/00* (2006.01)
*F21Y 115/10* (2016.01)
*F21Y 113/13* (2016.01)

(52) U.S. Cl.
CPC ...... *F21W 2121/00* (2013.01); *F21Y 2113/13* (2016.08); *F21Y 2115/10* (2016.08)

(56) References Cited

U.S. PATENT DOCUMENTS

| | | |
|---|---|---|
| 2011/0116259 A1 | 5/2011 | Plonski et al. |
| 2012/0162964 A1 | 6/2012 | Mustafa et al. |
| 2012/0201025 A1* | 8/2012 | Cash ................ F21K 9/232 362/231 |
| 2015/0097496 A1* | 4/2015 | Edwards ............ F21S 10/02 315/294 |

* cited by examiner

DYNAMIC COLOR SHADOWS FOR DECORATIVE WHITE LIGHTING

CROSS-REFERENCE TO PRIOR APPLICATIONS

This application is the U.S. National Phase application under 35 U.S.C. § 371 of International Application No. PCT/EP 2016/055847, filed on Mar. 17, 2016, which claims the benefit of European Patent Application No. 15161843.6, filed on Mar. 31, 2015. These applications are hereby incorporated by reference herein.

FIELD OF THE INVENTION

The present invention relates a lighting device for creating decorative light effects.

BACKGROUND OF THE INVENTION

The rapid development of lighting devices have provided for more energy efficient lighting but also for new possibilities for applications and design. For example, in recent years, light emitting diodes (LEDs) have emerged as a strong competitor on the market for lighting applications, mainly due to their superior energy efficiency over other existing technologies such as e.g. fluorescent lighting tubes.

With the development of the lighting devices, new demands on functionality such as lighting effects emerge. Such lighting effects may be deformable or in other ways changing light patterns. For example, shadows created by a mask may be desired to be movable or in other ways modifiable.

Another example of decorative lighting involves creating color shadows that are cast on objects in the surroundings of the lighting device. Such color shadows may be created by placing e.g. light emitting LEDs with different colored light next to each other such that they together create white light. An object blocking the light emitted by the LEDs may block light from colored light emitting diodes different amounts for each of the diodes, which results in a color shadow on an object behind the blocking object.

US20110116259 discloses an example of a system capable of creating a color shadow. The system disclosed in US20110116259 may detect a color of a shadow behind an object, and then adjust the emitted light according to a desired color of the shadow.

However, more flexibility in controlling the color shadows may be desired. For example, it may be desirable to only have a white light output or even have a more dynamic appearance of the color shadows.

SUMMARY OF THE INVENTION

A general object of the present invention is to provide a lighting device capable of producing white light and induce dynamic color shadows.

According to a first aspect of the invention it is therefore provided a lighting device comprising:

a light source arrangement comprising multiple light sources of different colors configured to emit a respective light beam, wherein a total light emitted by the light source arrangement produces a white light beam;

a contrast producing element comprising an optically transmissive portion and a second portion being at least partly optically blocking, the contrast producing element being arranged to receive white light from the light source arrangement;

a control unit configured to control the light source arrangement to modulate a spatial light spectral distribution of the total light emitted by the light source arrangement at the contrast producing element, thereby dynamically changing color shadows created by the contrast producing agent in cooperation with the multiple light sources; and a selector for switching the lighting device between a first mode in which the control unit is inactive and the lighting device emits white light, and a second mode in which the control unit is active and the lighting device emits dynamically changing color shadows.

Optically transmissive may be e.g. transparent, semi-transparent, translucent, or combinations thereof. The control unit may be in the form of a micro-processor. The selector may be e.g. a switch disabling the control unit, or putting the control unit in an idle mode.

The expression "spatial light spectral distribution" is intended to indicate the distribution of light color in a spatial extension. To modulate the spatial light spectral distribution thus means to change the spatial extension of certain wavelengths of the emitted light. Thus, the overall spectral content of the emitted light is not changed, but the spectrum over a specific spatial extension is changed. For example, in an arrangement with red, green and blue light sources, the location of the green light source may be moved to a different position. This will not affect the overall spectrum, but the spatial distribution of the spectrum will change.

The present invention is based on the realization that a lighting device may be able to produce both white light and changing color shadows by disabling or enabling a modulation of spatial light distribution. It is further realized that by arranging multiple light sources of different colors in such a way that they together produce white light, it is still possible to induce dynamic patterns based on changing color shadows by modifying a spatial light distribution of the emitted light of a certain color.

The multiple light sources may comprise a red light source, a green light source, and a blue light source, each light source being e.g. a light emitting diode. The emitted white light has preferably a correlated color temperature (CCT) between 2.000 K and 10.000 K. The CCT of the emitted white light is constant during operating of the lighting device.

The emitted white light has preferably a color rendering index (CRI) above 70, or above 80 or even above 90. Preferably, the CRI of the emitted white light is constant during operating of the lighting device.

The emitted white light has preferably a color point which is substantially on the black body line (BBL), within 15 SDCM (Standard Deviation of Color Matching) from the BBL during operating of the lighting device, or within 10 SDCM, or even within 5 SDCM. The multiple light sources (e.g. constituting a red, a green, and a blue light source) which produce white light are positioned with a spacing between each light source, preferably with a spacing of ≤2 mm, more preferably ≤1 mm, most preferably ≤0.5 mm. The spacing is the distance from a first light source to the neighboring light source. Naturally, the multiple light sources of the light source arrangement may comprise more than one light source of the same color. For example, the light source arrangement may comprise two red, two green and two blue light sources.

According to one embodiment of the invention, the lighting device may comprise a further light source being one of a red light source, a green light source, and a blue light source, wherein, for modulating the spatial light spectral distribution, the control unit is configured to, according to a time varying scheme, modify an intensity of the further light source and an intensity of a first light source of the light source arrangement emitting a light beam of the same color as the further light source, wherein the intensity of the light from the further light source and from the first light source are synchronized and opposite in intensity variation. Thus, the dynamic color shadows may be created in an advantageous way by only using colored light sources and by only modifying the intensity of the output light of the light sources.

The further colored light source (e.g. a second light source, e.g. green) or second colored light sources (e.g. red, green, blue) are positioned preferably >2 mm, more preferably >4 mm, most preferably >5 mm from the first multiple light sources.

In another configuration a third light source may be included. For example, the lighting arrangement may comprise multiple light sources (e.g. red, green, and blue) positioned next to each other (e.g. at distance ≤2 mm), a green light source positioned at a distance of 4 mm from the multiple light sources, and a green light source positioned at a distance of 8 mm from the multiple light sources.

The multiple light sources and the further light source may be arranged in a light chamber, such as a reflective chamber or a reflector device.

The time varying scheme may be one of a pulse width modulation scheme and a continuous current scheme. For example, in case of a pulse width modulation scheme, when the further light source emits light in a high intensity state, the intensity of the first light source is in a low state, and vice versa.

In one embodiment of the invention, the lighting device may comprise a white light source configured to emit white light, wherein, for modulating the spatial light spectral distribution, the control unit is configured to modify the intensity of the light emitted from at least one of the multiple light sources with respect to another one of the multiple light sources and with respect to the intensity of the white light. Thus, in this way, dynamic color shadows of more than one color may be created since any of the intensity of any of the multiple light sources may be modified.

Alternatively or additionally, the multiple light sources are a respective phosphor element. Thus, the lighting device may comprise a phosphor system comprising a set of phosphor elements, wherein each of the multiple light sources is a respective phosphor element in the set of phosphor elements.

With the phosphor elements, alternative ways of accomplishing a modulated spatial light spectral distribution are possible. For example, the lighting device may further comprise a light beam redirecting element and a light emitting element, wherein the light emitting element is arranged to emit a light beam towards the light beam redirecting element, and wherein the light beam redirecting element is arranged to scatter the light beam towards the phosphor elements, the light beam redirecting element comprising two portions having different scattering properties, and the light beam redirecting element being movable such that an illumination position of the scattered light beam on the phosphor elements is modifiable, wherein a spatial separation between at least two of the red light source, the green light source, and the blue light source are modifiable for modulating the spatial light spectral distribution.

As described, the light emitting element (e.g. a laser) is arranged to emit a light beam on the light beam redirecting element which scatters the light beam into several light beams. Each of the light beams hits a phosphor element. When the light beam redirecting element is moved such that the light beam from the light emitting element hits a different portion with different scattering properties, the illumination position on the phosphor is modified, thereby modulating the spatial light spectral distribution.

Another way of modulating the spatial light spectral distribution is to modulate the spatial separation between phosphor elements. For example, the lighting device may further comprise a light emitting element and a second set of phosphor elements, wherein a spatial distribution of the phosphor elements of the first set is different from a spatial distribution of the phosphor elements of the second set, wherein the first set and the second set are movable with respect to the light emitting element, and wherein the light emitting element is arranged to alternatively emit light towards the first set and the second set of phosphor elements.

The second portion of the contrast producing element may advantageously be a light blocking portion, thereby efficiently creating shadows. Alternatively, the second portion of the contrast producing element is an optically diffuse portion.

There may be situations where it is desired to modify the dynamic color shadows depending on the environment. Therefore, the lighting device may further comprise a sensor arranged to detect a signal indicative of at least one of an amount of light, a color of the light, a temperature, a humidity, and a presence of a person, each in the vicinity of the lighting device, wherein the control unit is configured to adapt a level of modification of the spatial light spectral distribution.

The dynamic color shadows may also be modified depending on place, date, time, season, etc.

Preferably, the lighting device may be arranged in e.g. a luminaire or in a light engine, or a lamp. For example, it can be used as a replaceable lighting source in a luminaire or similar. A luminaire may for example be arranged to illuminate a room.

Furthermore, the emitted white light may have a color point and color rendering index which do not change during operation of the lighting device.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing exemplary embodiments of the invention, wherein.

DESCRIPTION OF EXAMPLE EMBODIMENTS OF THE PRESENT INVENTION

In the following description, the present invention is described with reference to example applications or embodiments. It should, however, be noted that this by no means limits the scope of the invention, which is equally applicable to e.g. other applications, such as general light equipments, LED lamps, coded light luminaries.

Figure 1:
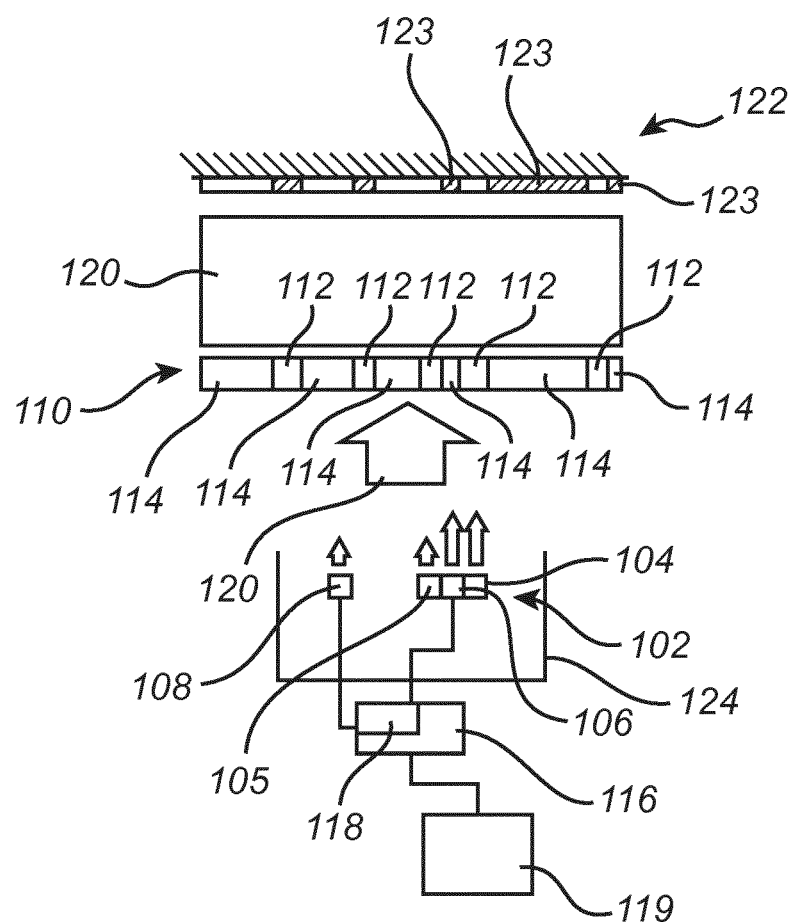
FIG. 1 illustrates a lighting device according to an embodiment of the invention.

FIG. 1 illustrates an example of a lighting device according to an embodiment of the invention. FIG. 1 shows a light source arrangement 102 comprising multiple light sources, in this case three light sources 104, 105, 106, and a further light source 108. There is further a contrast producing element 110 comprising an optically transmissive portion 112 and a second portion 114 which in this case is optically blocking but may also be e.g. semi-transparent or diffuse. The contrast producing element is arranged to receive light emitted from the multiple light sources 104, 105, 106. Furthermore, a control unit 116 is connected to the light source arrangement 102 to control the multiple light sources 104, 105, 106 and the further light source 108. As part of the control unit 116, there is here shown a selector 118 which operates to switch the control unit 116 between an active and inactive mode. The selector may also be separate from the control unit 116. Naturally, there is also a power supply 119 for providing electrical power to the control unit 116 and to the light source arrangement 102.

The multiple light sources, which for example may be a red light source 104, a green light source 105 and a blue light source 106, are each configured to emit a light beam, however, the total light emitted by the collected light beams from the multiple light sources 104, 105, 106 is a white light beam 120. The further light source 108 is configured to emit any of red, green, or blue light, i.e. any of the colors of the multiple light sources. In this case, the further light source 108 emits green light. The total light including the light emitted by the further light source 108 is received by the contrast producing element 110. Since the contrast producing element 110 comprises the optically blocking portions 114, shadows 123 are created on an object 122 illuminated by the lighting device 100. Optionally, the further light source 108 and the multiple light sources 104, 105, 106 are arranged in a light chamber 124 which may be a reflective chamber.

Figure 2A:
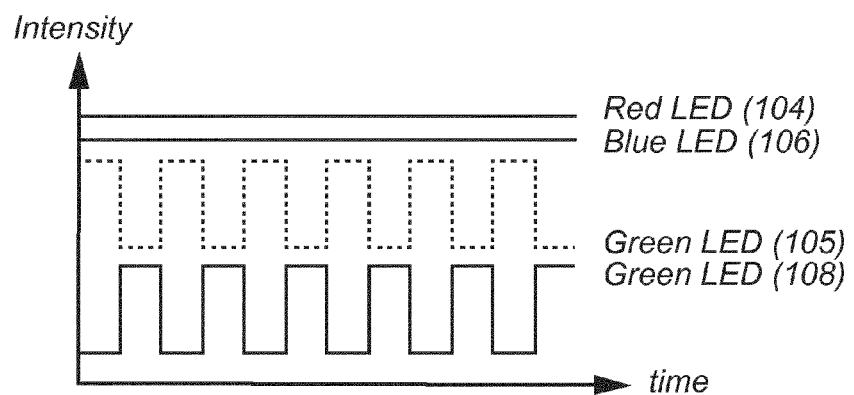
FIG. 2a-b schematically illustrates example time varying schemes.
Figure 2B:
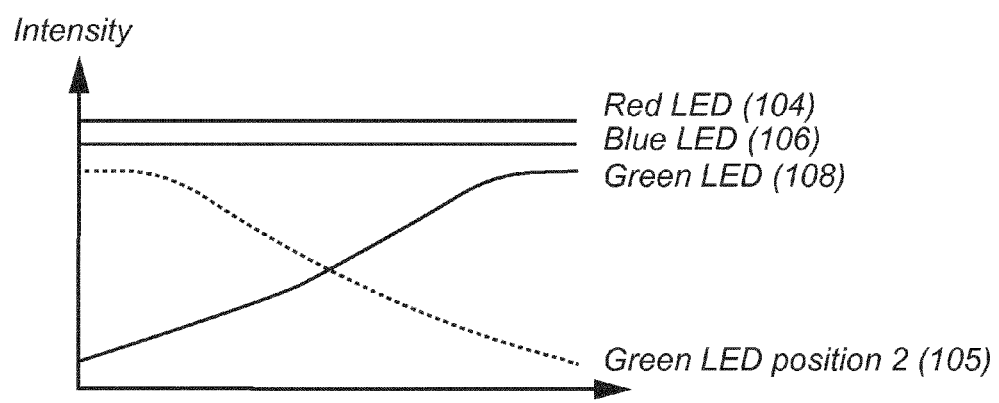

In the active mode, the control unit 116 controls the light source arrangement 102 to modulate a spatial light spectral distribution of the total light. This may be achieved by modulating an intensity of the emitted light from the further light source 108, which in this case is a green light source, and the green light source 105 according to a time varying scheme. The time scale of the modulation is such that the changing color shadows should be observable by a user. Preferably, the change in color shadows from a first configuration to a second configuration, takes at least one second. The modulation is such that the correlated color temperature (CCT) of the total emitted light does not change, i.e. the total emitted light is maintained at a white color. An example of a time varying scheme is a pulse width modulation scheme, as shown in FIG. 2a. Another example of a time varying scheme is a continuous current scheme as shown in FIG. 2b. In a pulse width modulation scheme, as shown in FIG. 2a, the pulses of the modulated light are synchronous and opposite such that the total intensity of green light is kept constant but the spatial extension is varied. In the continuous current scheme (FIG. 2b), the continuous change in intensity is in the same way opposite to each other such that the total intensity of green light is kept constant but the spatial extension is varied. In the inactive mode, the modulation of the spatial light spectral distribution is disabled. Of course other time varying schemes are also possible.

In another embodiment, the further light source 108 may be a white light source 108. The white light source 108 may in itself be made up from multiple light sources where individual light sources of the further multiple light sources and the first multiple light sources 104, 105, 106 having the same color are modulated according to a time varying scheme. In the case that the further light source (108) is a single white light source and the multiple light sources 104, 105, 106 are red, green, and blue light sources dynamic color shadow can be obtained by switching the light output of the white light source 108 with respect to the multiple light sources 104, 105, 106. In this configuration the multiple light sources 104, 105, 106 produce white light and are arranged a distance from each other larger than in the case of the further light source having a color, the distance may be e.g. larger than 5 mm. The CCT of the white light of the white light source 108 and the multiple light sources 104, 105, 106 is the same. The white light has a CCT between 2.000 and 10.000 K. Preferably the white light is on or near the BBL. And preferably both modes (active and inactive) give a CRI above 70 and may be the same, although this is not required.

Figure 5:
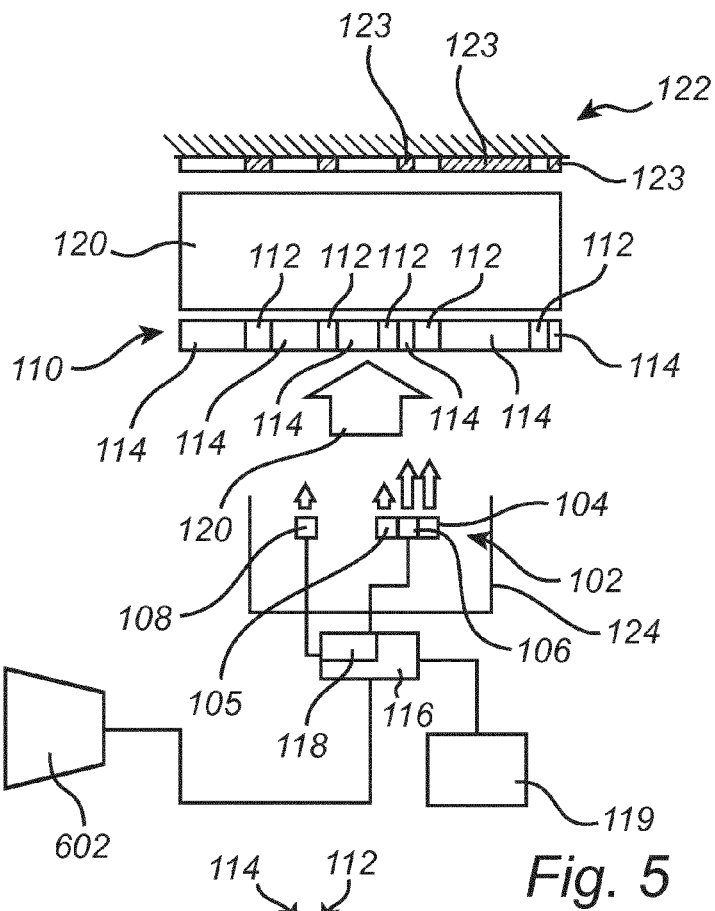
FIG. 5 illustrates a lighting device according to an embodiment of the invention.

Furthermore, as shown in FIG. 5, a sensor 602 may be arranged to detect a signal indicative of environmental properties (e.g. an amount of light, a color of the light, a temperature, a humidity) surrounding the lighting device or the presence of a person in the vicinity of the lighting device. The control unit 116 may then adapt the level of modification of the spatial light spectral distribution. For example, if there is a person present in the same room as the lighting device 100, the color shadows may be adapted such that the comfort of being in the room is increased, e.g. less or more profound color shadows.

Figures 3A, 3B:
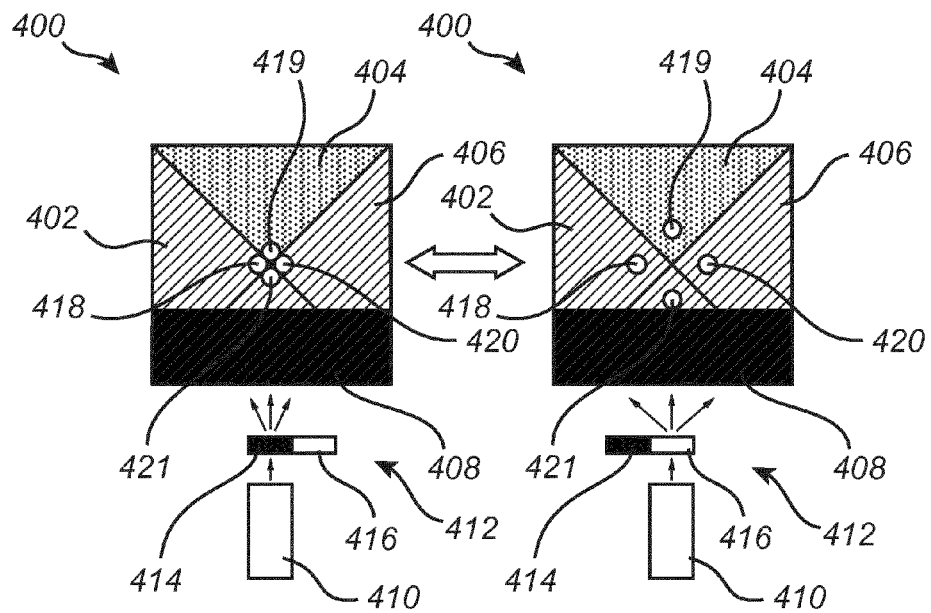
FIG. 3a-b illustrates an example of a light source arrangement.

There are other ways to obtain the light source arrangement, for example, as shown in FIG. 3a-b showing an example of a light source arrangement 500. In FIG. 3a-b, a set of phosphor elements 402, 404, 406, 408 and a light emitting element being a laser 410, although other alternatives for the light emitting element are possible, and a light beam redirecting element 412. The light beam redirecting element 412 may for example be a refractive or diffractive optical element. The light beam redirecting element is in the shown embodiment a diffuse optical element which has two portions 414, 416 which redirect light differently, e.g. portion 416 redirects a light into a wider angle than portion 414. The light beam redirecting element 412 is arranged such that it receives a light beam from the laser 410, and redirects light beams towards the set of phosphor elements 402, 404, 406, 408. The light beam redirecting element 412 is movable between two positions as shown in FIG. 3a (position 1) and FIG. 3b (position 2) such that the light beam emitted by the laser 410 is received by different portions (e.g. 414 or 416) of the diffuse optical element and thereby the redirecting (or scattering) of the light beam may be modulated. For illustrative purposes, four illumination positions 418, 419, 420, 421 are shown in the set of phosphor elements 402, 404, 406, 408. When the light beam redirecting element 412 moves from the first to the second position, the illumination positions also change (FIG. 3a to FIG. 3b), and thereby also the spatial light spectral distribution emitted from the set of phosphor elements 402, 404, 406, 408. In other words, instead of modulating individual intensities of the light sources 104, 105, 106 and the further light source 108 in FIG. 1 and FIG. 2 for modulating the spatial light spectral distribution, it is possible with the embodiment shown in FIG. 3a-b to modulate the spatial light spectral distribution by modulating the distance between the light sources, here shown as the illumination positions on the set of phosphor elements 402, 404, 406, 408.

Figure 4:
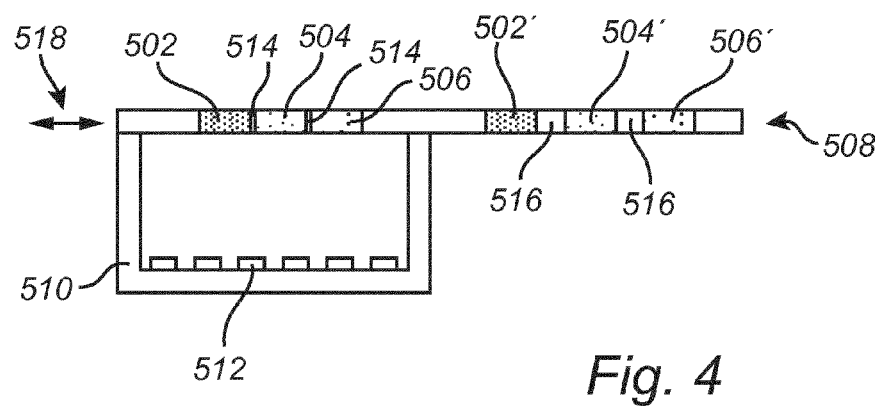
FIG. 4 illustrates another example of a light source arrangement.

FIG. 4 illustrates another light source arrangement 500 of an embodiment of the invention. The light source arrangement 500 includes two sets of phosphor elements 502, 504, 506 and 502', 504', 506' arranged in a movable holder 508 having a planar shape. There is further a housing 510 which accommodates a plurality of light sources 512 (only one is numbered). The light sources may for example be LEDs emitting white light. In the light source arrangement, the spacing 514 between the individual phosphor elements 502, 504, 506 is smaller in the first set compared to the spacing 516 between the individual phosphor elements 502', 504', -506' of the second set. When the holder 508 moves back and forth in the direction of the arrow, the light emitted be light sources 512 is received, alternating by the first set of phosphor elements 502, 504, 506 and by second set of phosphor elements 502', 504', 506'. Thereby, it is possible to modulate the spatial light spectral distribution by alternating the set of phosphor elements to receive the light emitted by the light sources 512.

Figure 6:
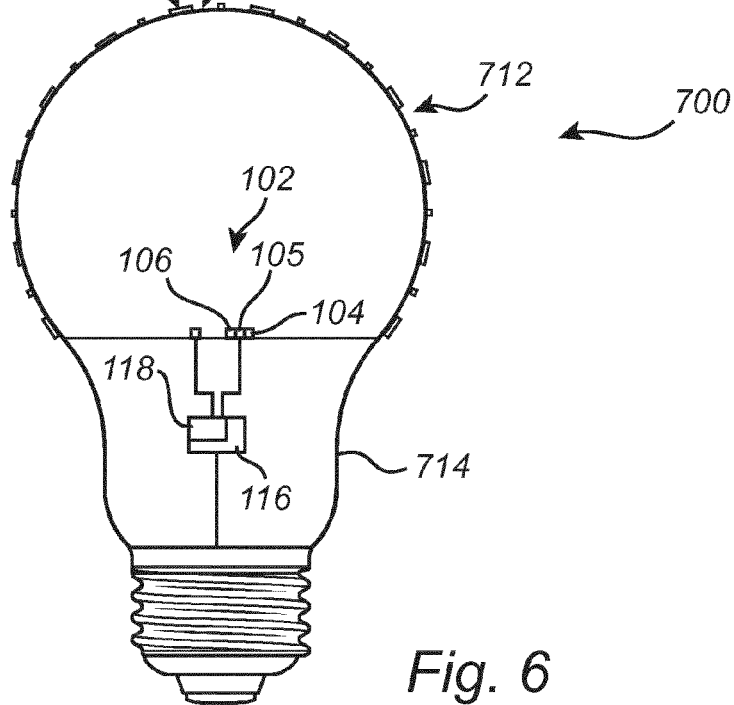
FIG. 6 illustrates a lighting device according to an embodiment of the invention.

FIG. 6 shows a lighting device 700 according to the invention in the form a light bulb 700. Similarly to FIGS. 1 and 2, there is a contrast producing element 712 having optically blocking portion 114 and optically transmissive portion 112 arranged to receive light emitted by a light source arrangement 102 comprising multiple light sources 104, 105, 106, and a further light source 108. The contrast producing element 712 has here a bulb shape, but other shapes are of course possible, e.g. a tube shape. The control unit 116 and the selector 118 are arranged in the base part 714 of the light bulb 712.

Additionally, variations to the disclosed embodiments can be understood and effected by the skilled person in practicing the claimed invention, from a study of the drawings, the disclosure, and the appended claims. For example, the lighting device may be arranged a light engine or a luminaire or as other shaped light bulbs than what is described herein.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A lighting device for illuminating an object, the lighting device comprising:
a light source arrangement comprising multiple light sources of different colors configured to emit a respective light beam, wherein a total light emitted by said light source arrangement produces a white light beam;
a contrast producing element comprising an optically transmissive portion and a second portion being at least partly optically blocking, said contrast producing element being arranged to receive white light from said light source arrangement, and to create shadows on the object;
a control unit configured to control said light source arrangement to modulate a spatial light spectral distribution of the total light emitted by said light source arrangement at said contrast producing element; and
a selector for switching said lighting device between a first mode in which said control unit is inactive and said lighting device emits white light, and a second mode in which said control unit is active, and
wherein in the second mode said lighting device is arranged to create dynamically changing color shadows on the object.

2. The lighting device according to claim 1, wherein said multiple light sources comprises a red light source, a green light source, and a blue light source, each light source being a light emitting diode.

3. The lighting device according to claim 1, comprising a further light source being one of a red light source, a green light source, and a blue light source,
wherein, for modulating said spatial light spectral distribution, said control unit is configured to, according to a time varying scheme, modify an intensity of said further light source and an intensity of a first light source of said light source arrangement emitting a light beam of the same color as the further light source, wherein the intensity of the light from the further light source and from the first light source are synchronized and opposite in intensity variation.

4. The lighting device according to claim 3, wherein said time varying scheme is one of a pulse width modulation scheme and a continuous current scheme.

5. The lighting device according to claim 1, wherein said multiple light sources and any further light source are arranged in a light chamber.

6. The lighting device according to claim 1, further comprising a white light source configured to emit white light, wherein, for modulating said spatial light spectral distribution, said control unit is configured to modify the intensity of the light emitted from at least one of said multiple light sources with respect to another one of said multiple light sources and with respect to the intensity of the white light.

7. The lighting device according to claim 1, comprising a phosphor system including a set of phosphor elements, wherein each of said multiple light sources is a respective phosphor element in said set of phosphor elements.

8. The lighting device according to claim 7, further comprising a light beam redirecting element and at least one light emitting element,
wherein said light emitting element is arranged to emit a light beam towards said light beam redirecting element, and
wherein said light beam redirecting element is arranged to scatter said light beam towards said phosphor elements, said light beam redirecting element comprising two portions having different scattering properties, and said light beam redirecting element being movable such that an illumination position of said scattered light beam on said phosphor elements is modifiable,
wherein a spatial separation between at least two of said red light source, said green light source, and said blue light source is modifiable for modulating said spatial light spectral distribution.

9. The lighting device according to claim 8, further comprising a second set of phosphor elements,
wherein a spatial distribution of said phosphor elements of said first set is different from a spatial distribution of said phosphor elements of said second set, wherein said first set and said second set are movable with respect to said light emitting element, wherein said light emitting element is arranged to alternatively emit light towards said first set and said second set of phosphor elements.

10. The lighting device according to claim 1, wherein said second portion of said contrast producing element is a light blocking portion.

11. The lighting device according to claim 1, wherein said second portion of said contrast producing element is an optically diffuse portion.

12. The lighting device according to claim 1, further comprising a sensor arranged to detect a signal indicative of at least one of an amount of light, a color of the light, a temperature, a humidity, and a presence of a person, each in the vicinity of the lighting device, wherein said control unit is configured to adapt a level of modification of said spatial light spectral distribution.

13. The lighting device according to claim 1, wherein said lighting device is arranged as one of a light engine, a lamp bulb, or a luminaire.

14. The lighting device according to claim 1, wherein the emitted white light has a color point which do not change during operation of the lighting device.

15. The lighting device according to claim 14, wherein the emitted white light further has color rendering index which do not change during operation of the lighting device.

16. The lighting device according to claim 1, wherein the dynamically changing color shadows comprise a shadow of said second portion of said contrast producing element.

* * * * *